United States Patent

[11] 3,614,404

[72] Inventor Mark M. Garfein
Dewitt, N.Y.
[21] Appl. No. 816,965
[22] Filed Apr. 17, 1969
[45] Patented Oct. 19, 1971
[73] Assignee General Electric Company

[54] ELECTRONIC CALCULATOR
5 Claims, 13 Drawing Figs.

[52] U.S. Cl. .......... 235/159, 235/168, 235/174
[51] Int. Cl. .......... G06f 7/48
[50] Field of Search .......... 235/156, 159, 168, 169, 173, 174, 150.3

[56] References Cited

UNITED STATES PATENTS

| | | | |
|---|---|---|---|
| 2,928,601 | 3/1960 | Curtis | 235/169 X |
| 3,112,396 | 11/1963 | Heywood | 235/170 |
| 3,278,734 | 10/1966 | Ulbrich et al. | 235/174 X |
| 3,304,418 | 2/1967 | Perrotto et al. | 235/169 |
| 3,460,129 | 8/1969 | Thorvaldsson | 235/150.3 |
| 3,508,037 | 4/1970 | Collins et al. | 235/159 |
| 3,513,303 | 5/1970 | Kitz et al. | 235/160 |

*Primary Examiner*—Malcolm A. Morrison
*Assistant Examiner*—Charles E. Atkinson
*Attorneys*—Marvin A. Goldenberg, Richard V. Lang, Frank L. Neuhauser and Oscar B. Waddell

ABSTRACT: An inexpensively fabricated electronic calculator for efficiently performing basic mathematical operations including addition, subtraction, multiplication and division is disclosed. In the multiplication operation binary coded numbers are transformed into a unary code using a serial, digit-by-digit technique. A logical design is employed which permits a circuit construction utilizing relatively inexpensive semiconductor devices, specifically of an integrated circuit MOSFET design. In addition and subtraction operations binary-coded decimals are employed throughout, with correction of uncorrected sums being made by suitable modifications of the circuit which permit the adder-subtracter network per se to be traversed twice thereby obviating the need for a separate correction network. A division operation is performed employing multiplication and addition-subtraction circuitry.

INVENTOR:
MARK M. GARFEIN,
BY [signature]
HIS ATTORNEY.

INVENTOR:
MARK M. GARFEIN,
BY Marvin C. Coles [signature]
HIS ATTORNEY.

INVENTOR:
MARK M. GARFEIN,
BY [signature]
HIS ATTORNEY.

INVENTOR:
MARK M. GARFEIN,
BY Marvin L. Gollenberg
HIS ATTORNEY.

INVENTOR:
MARK M. GARFEIN,
BY Marvin [signature]
HIS ATTORNEY.

INVENTOR:
MARK M. GARFEIN,
BY [signature]
HIS ATTORNEY.

INVENTOR:
MARK M. GARFEIN,
BY Marvin Goldenberg
HIS ATTORNEY.

ELECTRONIC CALCULATOR

BACKGROUND OF THE INVENTION

1. Field of the Invention

The invention relates to the field of low-cost electronic calculators designed to perform basic mathematical functions, in particular to electronic desk top calculators.

2. Description of the Prior Art

The past several years has been the advent of small totally electronic calculators designed to perform basic mathematical functions. These machines are intended to replace mechanical and and electromechanical desk calculators, holding the principal advantages of speed, weight, quiet operation and, potentially, cost. The electronic machines developed to date are essentially small, special purpose computers designed along the lines of large scale computers, including appreciable storage capacity and employing numerous high-speed devices. Thus, presently available electronic calculators are not found to be competitive on a cost basis with the older form of machines. The present invention introduces innovations into the circuitry of the electronic calculator so as to appreciably reduce its cost.

SUMMARY OF THE INVENTION

It is a principal object of the invention to provide a novel electronic calculator capable of accurately performing basic mathematical functions which can be fabricated at costs substantially reduced relative to presently available electronic calculators.

It is another object of the invention to provide a novel electronic calculator which has reduced hardware requirements.

It is a further object of the invention to introduce novel computing techniques to an electronic calculator as above described which make possible the employment of inexpensive batch-fabricated circuitry, in particular MOSFET integrated circuits.

Another object of the invention is to provide a novel electronic calculator as above described which implements simplified logic for obtaining product and quotient outputs.

It is yet another object of the invention to provide a novel electronic calculator as described which in performing addition-subtraction operations obviates the need for a separate correction network.

These and other objects are accomplished in accordance with one embodiment of the invention for performing multiplication of two binary-coded decimal numbers by a circuit which includes a binary-coded decimal counter into which the binary bits of the multiplicand are entered in a first digital sequence. There is further provided a binary-coded decimal rate multiplier having applied thereto in a second digital sequence the binary bits of the multiplier, said rate multiplier generating during a given period unary pulses which correspond in number to the quantity of the applied digit. The generated unary pulses are accumulated in an output accumulator. At the end of each given period the counter containing the multiplicand is caused to reduce its count by one. Upon reaching zero, generation of said unary pulses is terminated so that the accumulated pulses correspond to the product of digits applied to said decimal counter and rate multiplier.

In accordance with a further embodiment of the invention an addition and subtraction operation of two binary-coded decimal numbers is performed by a circuit which includes an adder-subtracter network to first and second inputs of which the binary bits of the first and second numbers are connected in digital sequence. An error sensor network responsive to the output of said adder-subtracter network generates an error signal in response to an incorrect output. The error signal is employed to switch the incorrect output back to said first inputs and to connect a correction constant to said second inputs, thereby providing a corrected output.

In accordance with yet another embodiment of the invention a division operation of two binary-coded decimal numbers is performed by a circuit which includes multiplier and addition-subtraction components as described above. The reciprocal of the divisor is obtained through an iterative process. The quotient is generated by multiplying the reciprocal quantity by the dividend.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

DESCRIPTION OF THE PREFERRED EMBODIMENTS

Figure 1:
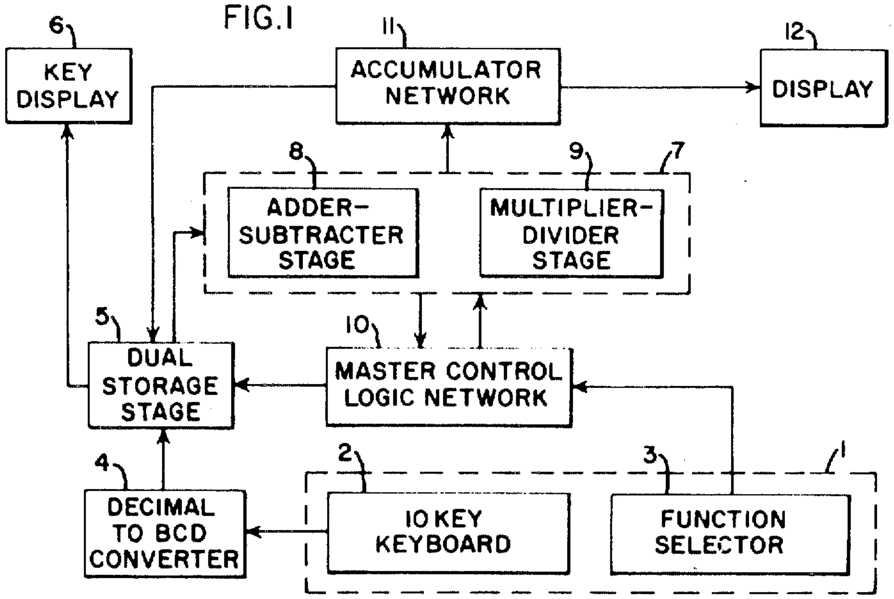
FIG. 1 is a general block diagram of an electronic calculator in accordance with the present invention.

FIG. 1 illustrates a general block diagram of a manually operated electronic calculator which broadly sets forth the major components of the present system and their functional relationship to one another. Represented are a keyboard panel 1 including a 10-key keyboard 2 for entering multidigit numbers into the machine and a function selector 3 for determining various functions to be performed. The keyboard 2 is coupled to a decimal to binary-coded decimal converter 4 which is in turn coupled to a dual storage stage 5. A key display 6 indicates the most recently stored number. The output of the stage 5 is coupled to computational circuitry 7 which includes an adder-subtracter stage 8 and a multiplier-divider stage 9. Although shown as two separate stages, for a division operation it will be seen that these blocks become interrelated and share common components. The function selector 3 is coupled to a master control logic network 10, in turn coupled to the computational circuitry 7. A further connection is provided between logic network 10 and storage stage 5. The output of the circuitry 7 is coupled to an accumulator network 11 and is displayed by display 12. A feedback connection is provided from the accumulator 11 to the storage stage 5.

Decimal numbers are manually entered into the machine through the keyboard 2. The function selector 3 may include a number of keys for selecting the mathematical functions to be performed as well as other conventional functions in the operation of such a machine such as ON, OFF, CLEAR and ERROR. Briefly, an operational sequence is as follows: (1)

Enter a first number into the keyboard 2. This number is instantaneously stored in one-half of the stage 5 and appears in the key display 6. (2) Depress the ENTER & ADD key of the function selector 3, which triggers the logic network 10 and causes the number stored in stage 5 to be added to the previously accumulated output. When the previous output is "0" the effect is to shift the number into the accumulator 11. (3) Enter a second number into the keyboard 2. (4) Depress the function selector 3 key of the function to be performed. In response thereto the logic network 10 generates a sequence of the control signals for performing the selected mathematical function, the resulting quantity being stored in the accumulator and appearing in the display 12.

Figure 2:
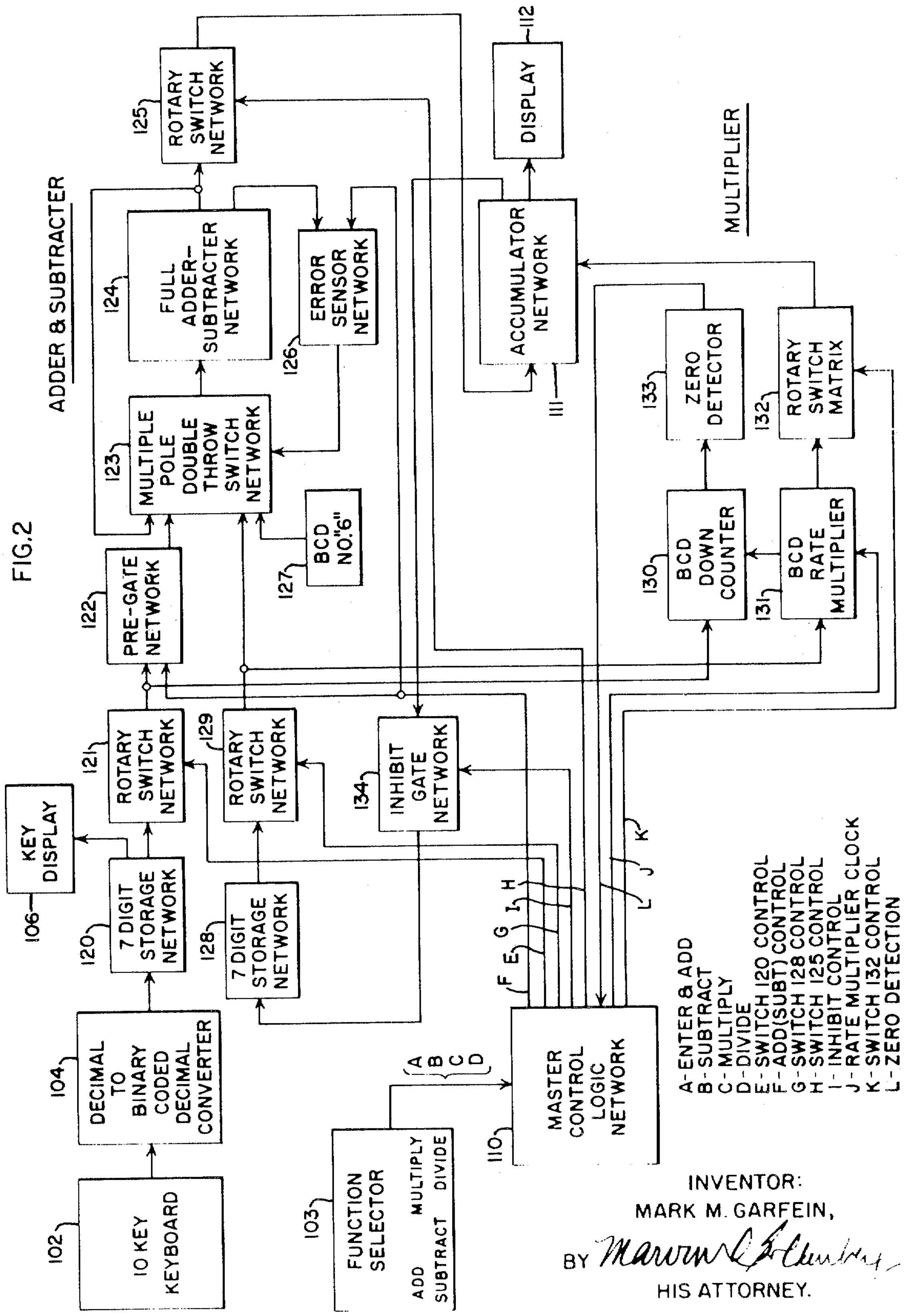
FIG. 2 is a functional block diagram of the electronic calculator of FIG. 1.

Shown in FIG. 2 is a functional block diagram of the adder-subtracter and multiplier circuitry of the present system. Blocks corresponding to those of FIG. 1 have similar reference characters, but elevated to the 100 series. It is noted that the functional lines coupled to logic network 110 are identified by letters, and the various signals transmitted along these lines are listed in FIG. 2. Function selector 103 is coupled to master control logic network 110 by control line A, B, C, D for initiating addition, subtraction, multiplication and division operations, the block diagram for division being illustrated in FIG. 13. The 10-key keyboard 102 is connected through a decimal to binary-coded decimal converter 104 to a first storage network 120. The network 120 stores seven binary-coded decimal digits, each digit comprising four binary bits. Key display 106 provides a visual indication of the number stored in the network 120. For addition-subtraction, a rotary switch network 121, under control of a master control logic network 110, sequentially connects each digit stored in the network 120 to a pregate network 122 of the adder-subtracter circuitry. Control line E is coupled to network 121 for effecting the noted operation. The network 122, under control of control line F, makes a subtraction operation compatible with addition by introducing the number's one complement when performing subtraction. The output of network 122 is connected through a multiple-pole, double-throw switch network 123 to a full adder-subtracter network 124. A second input is sequentially supplied to adder-subtracter network 124 from a seven-digit storage network 128 through rotary switch network 129, governed by control line G from logic network 110, and MPDT switch network 123. The sum or difference output from adder-subtracter network 124 is connected to a rotary switch network 125, governed by control line H, and is also fed back to MPDT switching network 123. A further output of network 124 is coupled to an error sensor network 126, governed by control line F from logic network 110, for sensing an uncorrected sum or difference output from network 124, which will occur when forming a sum greater than 9. A signal from error sensor 126 is connected to operate switch network 123 through which the uncorrected output of network 124 is fed back to its input together with the binary-coded decimal number "6" from a fixed source 127. A corrected output is thereby generated. The corrected output is sequentially connected through rotary switch network 125, governed by control line H from logic network 110, to a 14 digit accumulator network 111. The accumulator network output is connected to a display component 112 for visually indicating its stored quantity, and is further connected back through an inhibit gate network 134 to storage network 128. The normally closed inhibit network 134 is under the control of an inhibit signal from logic network 110 on control line I for opening its gates. This transfers the contents of the accumulator network 111 into the storage network 128, which actually occurs prior to each mathematical function sequence.

Considering now the multiplication circuitry, the output of the rotary switch network 121 is further connected to a binary-coded decimal down counter 130. The output of rotary switch network 129 is further connected to a binary-coded decimal rate multiplier 131. Also connected to rate multiplier 131 is a clock signal from logic network 110 transmitted on control line J. The rate multiplier 131 generates unary pulses at its output from which the product quantity is obtained. The unary pulses are sequentially connected through a rotary switch matrix 132, governed by control line K, to the accumulator 111. It also provides a trigger to the BCD down counter 130 for actuating this device. The BCD down counter 130 is coupled to a zero detector 133 which detects a zero condition of the counter and couples this information back to the master control logic network 110 for arresting the clock signals and actuating switch networks 120, 128 and 132.

Figure 3:
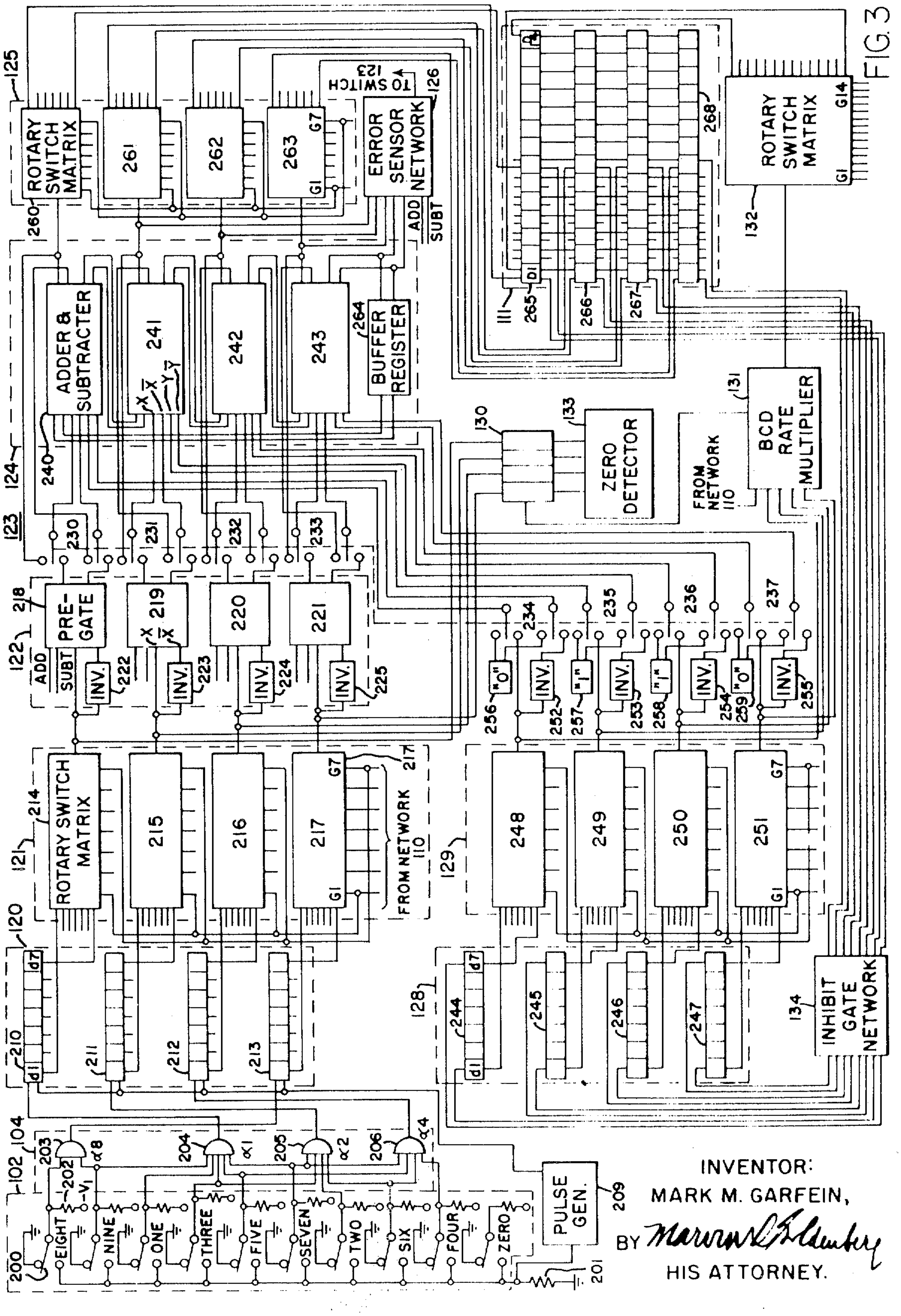
FIG. 3 is the more detailed schematic block diagram of the present electronic calculator, conforming to the diagram of FIG. 2.

In FIG. 3 the adder-subtracter and multiplier circuitry is shown in still greater detail in a schematic functional diagram. The blocks of FIG. 3 that are the same as those of FIG. 2 are identified by identical reference characters.

The 10-key keyboard 102 is a conventional component integrally connected with the decimal to binary-coded decimal converter 104. The keyboard includes 10 single-pole, double-throw switches 200 representing decimal digits zero through none. The switches 200 are schematically shown as electromechanical switches, although in practice they may be electronic touch responsive devices. First fixed terminals of said switches are joined together and connected through a current limiting resistor 201 to ground, and second fixed terminals are connected to ground. The movable contacts of switches 200 are each connected through a bias resistor 202 to a negative voltage source $-V_1$. The movable contacts are further connected to four NAND-gates 203, 204, 205 and 206, the outputs of which represent, respectively, four binary bit orders $\alpha 8$, $\alpha 1$, $\alpha 2$ and $\alpha 4$ of the binary-coded decimal number. The encoding function is performed by appropriate connections from the switches 200 to the NAND-gates 203 through 206. Specifically, switches eight and nine provide inputs to gate 203, switches nine, one, three, five and seven provide inputs to gate 204, switches three, seven, two and six provide inputs to gate 205; and switches five, seven, six and four provide inputs to gate 206. A pulse generator 209 is connected from resistor 201 to storage network 120 for shifting the stages thereof.

The storage network 120 includes four seven-stage registers 210, 211, 212 and 213 for storing, respectively, the binary bits $\alpha 1$, $\alpha 2$, $\alpha 4$ and $\alpha 8$ for each digit $d_1$ through $d_7$. These bits are connected to the first stages of the registers from the corresponding NAND gates of the converter 104 and shifted each time a digit is entered into the keyboard.

Figure 7:
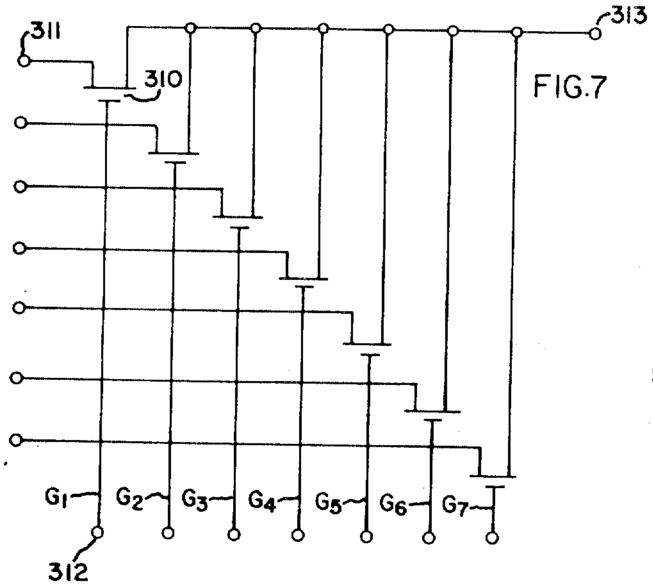
FIG. 7 is a schematic circuit diagram of a single-rotary switch matrix of FIG. 3.

The binary switch network 121 includes four identically constructed seven-input rotary switch matrixes 214, 215, 216 and 217, one switch matrix for each binary bit. The inputs of each switch matrix correspond to the digit stages of the associated storage register. Thus, the output of each stage of storage register 210 is connected to a corresponding input of rotary switch matrix 214. Similarly, registers 211, 212 and 213 are connected to rotary switch matrixes 215, 216 and 217, respectively. Control signals are connected from the master control logic network 110 jointly to control terminals $G_1$ through $G_7$ of the rotary switch matrixes so as to switch in parallel the binary bits of a single-decimal digit, the switching being accomplished in sequence with respect to each digit. A schematic diagram of a single seven-input rotary switch matrix is shown in FIG. 7 and will be considered in grater detail subsequently.

Figure 9:
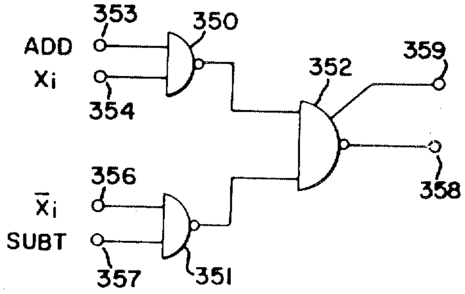
FIG. 9 is a schematic circuit diagram of a pregate component of FIG. 3.

The pregate network 122 includes four pregate components 218, 219, 220 and 221. The output of rotary switch 214 is directly connected as a true signal X to pregate component 218 and as a complementary signal $\overline{X}$ through an inverter 222. Similarly, converters 223, 224 and 225 are coupled at the outputs of switches 215, 216 and 217 for supplying true and complementary signals to components 219, 220 and 221. In addition, the pregate components have add and subtract control signals applied from the master control logic network 110. The pregate components are each identical and one such component is schematically illustrated in FIG. 9, to be discussed presently.

As illustrated, the multiple-pole, double-throw switch network 123 includes double-pole, double-throw switchs 230, 231, 232, 233, 234, 235, 236 and 237, operatively ganged together. Full adder-subtracter network 124 includes four similar full adder-subtracter components 240, 241, 242 and 243, for one of which is the schematic circuit diagram of FIG. 10. In one position the switch 230 connects true and complementary outputs from pregate components 218 as a first pair of inputs X and $\overline{X}$ to full adder-subtracter component 240. In its second position the switch 230 connects true and complementary outputs of the full adder-subtracter component 240 back to its first pair of inputs. Similar connections are provided by switches 231, 232 and 233 between pregate components 219, 220 and 221 and their corresponding adder-subtracter components 241, 242 and 243.

Storage network 128 includes four seven-stage registers 244, 245, 246 and 247, storing, respectively, binary bits $\alpha 1$, $\alpha 2$, $\alpha 4$ and $\alpha 8$ for each digit $d_1$ through $d_7$. Registers 244 through 247 store a second binary-coded decimal number to be operated upon, which number is entered in parallel from the accumulator network 111. These registers are equivalent to the registers 210 through 213. The rotary switch network 129 includes four identically constructed seven-input rotary switch matrixes 248, 249, 250 and 251, one matrix for each binary bit. The output of each stage of register 244 is connected to an input of rotary switch matrix 248. Similarly, registers 245, 246 and 247 are connected to rotary switch matrices 249, 250 and 251, respectively. Control signals from logic network 110 are applied jointly to control terminals $G_1$ through $G_7$ of the switch matrixes 248 through 251 so as to switch in parallel the binary bits of a single-decimal digit, the switching being accomplished in sequence with respect to each digit.

The output of rotary switch matrix 248 is connected as true and complementary signals to a first pair of fixed terminals of double-pole, double-throw switch 234, the complementary signal being derived by means of an inverter 252. A second pair of fixed terminals is connected to a source 256 generating a binary "0." In one position the moving contacts of switch 234 connect the true and complementary signals from rotary switch matrix 248 to a second pair of inputs Y and $\overline{Y}$ of full adder-subtracter component 240, and in the second position connect the true and complementary signals representing a "0" binary bit to said second pair of inputs. Similarly, inverters 253, 254 and 255 derive true and complementary signals from the output of switch matrixes 249, 250 and 251, these signals being coupled to first pairs of fixed terminals of switches 235, 236 and 237, respectively. Switches 235, 236 and 237 connect true and complementary signals from switch matrixes 249, 250 and 251 to inputs Y and $\overline{Y}$ of adder-subtracter components 241, 242 and 243, respectively, when in one position. In the second position they connect true and complementary signals representing binary "1," "1" and "0" from sources 257, 258 and 259, respectively, to the second pair of inputs of components 241, 242 and 243.

True and complementary carry outputs, or borrow outputs in subtract operations, are connected from the three lower order adder-subtracter components 240, 241 and 242 as a third pair of inputs to the next higher order adder-subtracter component. True and complementary carry (borrow) outputs from the highest order adder-subtracter component 243 are connected through a buffer register 264 to the third pair of inputs of the lowest order adder-subtracter component 240. This connection serves to apply a carry (borrow) signal from a given digit to the next higher digit in a sequential manner.

Figure 11:
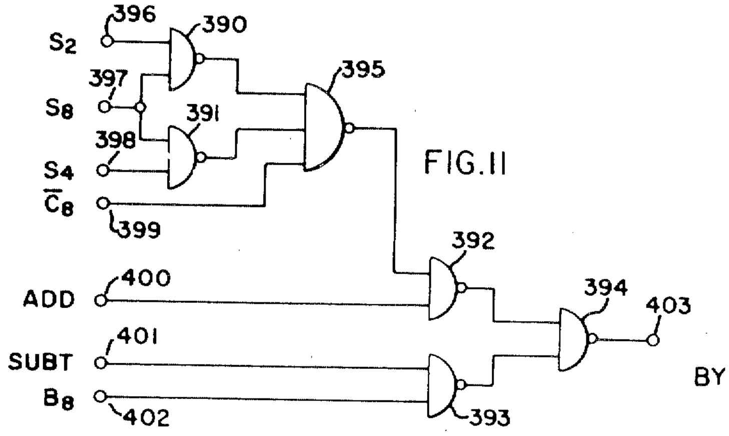
FIG. 11 is a schematic circuit diagram of the error sensor network shown in FIGS. 2 and 3.

The true output from each of the higher order three adder-subtracter components 241, 242 and 243, the true and complementary carry (borrow) outputs of the highest order adder-subtracter component 243, and add and subtract control signals from logic network 110 are connected to error sensor network 126. This network is schematically illustrated in FIG. 11, to be considered presently. The output of error sensor network 126 is applied to each of the DPDT switches 230 through 237 for gang connecting said switches into their second positions in response to an uncorrected output from the full adder-subtracter network 124.

Rotary switch network 125 includes four seven-output rotary switch matrixes 260, 261, 262 and 263, one for each binary bit, which are of similar construction to the switches of networks 121 and 129. Applied to the switches 260 through 263 as single inputs are the true output signals from corresponding adder-subtracter components 240 through 243.

The accumulator network 111 comprises four 14-stage registers 265, 266, 267 and 268 which provide a storage function for addition and subtraction operations. For multiplication operations, registers 265 through 268 operate as binary-coded decimal counter stages for providing a counting function. The outputs of rotary switch matrix 260 are connected to the first seven stages of the register 265. Similarly, the outputs of rotary switch matrixes 261, 262 and 263 are connected to the first seven stages of corresponding registers 266, 267 and 268. In response to signals from the master control logic network 110 to control terminals $G_1$ through $G_7$ of switch matrixes 260 through 263, the four bits of a given digit are concurrently switched into corresponding registers 265 through 268, the switching being in sequence with respect to successive digits. Outputs of the first seven stages of registers 265, 266, 267 and 268 are connected through inhibit gate network 134 to corresponding stages of the registers 244, 245, 246 and 247, respectively, of network 128.

Figure 12:
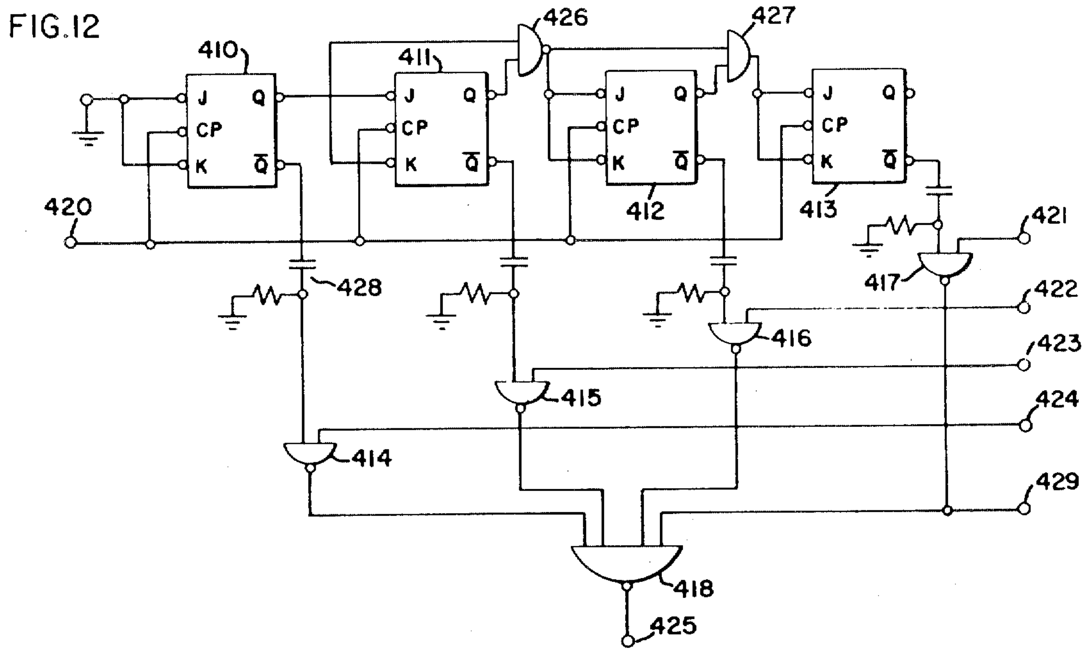
FIG. 12 is a schematic circuit diagram of the binary-coded decimal rate multiplier shown in FIGS. 2 and 3.

With respect to the multiplication circuitry, the outputs of rotary switch matrixes 214, 215, 216 and 217 are further connected in parallel to corresponding four stages of binary-coded decimal down counter 130, the outputs from each of the counter stages being connected to zero detector 133. The outputs of rotary switch matrixes 248, 249, 250 and 251 are further connected in parallel to the binary-coded rate multiplier 131 which is further provided with a clock signal from logic network 110. A schematic diagram of the BCD rate multiplier is shown in FIG. 12 to be described presently. The principal output from BCD rate multiplier 131 is connected through a 14 output rotary switch matrix 132 to each of the 14 stages of the accumulator register 265 for counting up and storing the unary pulses generated by the rate multiplier 131. A secondary output from BCD rate multiplier output 131 generating a trigger signal is connected to BCD down counter 130 for causing the counter to count down.

Considering the operation of the system of FIG. 3, an exemplary addition of two multidigit decimal numbers will be described. Normally, a CLEAR key on the keyboard panel is first actuated for clearing the accumulator resistors of any stored data. The first number to be added, the augend, is entered into the calculator by depressing the appropriate digit keys on the keyboard 102, the digits being entered in sequence, the most significant digit first. For example, if the most significant digit is one, depressing the ONE key removes the movable contact from the ground position and closes the circuit to the resistor 201. There is thus applied a negative potential, corresponding to a logic "0," to the input of NAND-gate 204, generating a logic "1" at its output, which is connected to the first stage of register 210. The remaining NAND-gates 205, 206 and 203 have entirely logic "1's" applied to their inputs and each generate logic "0's" at the output, which are coupled to the first stages of registers 211, 212 and 213, respectively. A first decimal digit of "1 " is now stored in the first stages. If the second most significant digit is seven, depressing the SEVEN key first causes a shift pulse to be generated from generator 209, which is applied to each stage of the storage registers 210, 211, 212 and 213 for shifting the binary bits of the first applied digit into the second stages of said registers, leaving the first stages cleared. Actuating the "7" switch also generates a logic "1" at the output of NAND-gates 204, 205 and 206 and a logic "0" at the output of gate 203. NAND-gates 204, 205, 203 and 206 are coupled to the first stages of registers 210, 211, 212 and 213, and the second decimal digit is stored. The remaining digits are sequentially entered in a similar fashion, a shift pulse being generated each time for shifting the previously entered digits and clearing the first stage for acceptance of a new digit.

Figure 4:
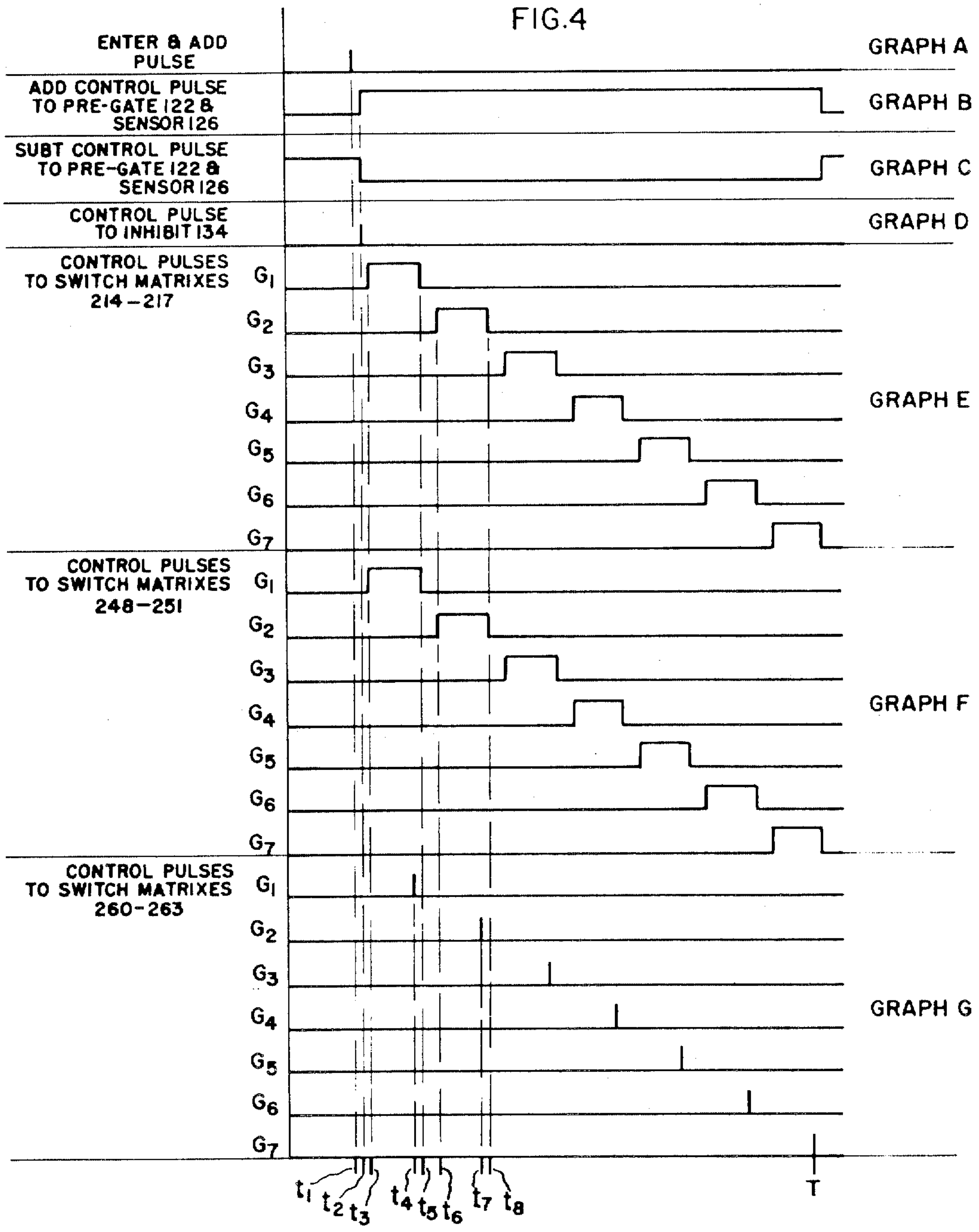
FIG. 4 presents a series of graphs employed in a description of the invention relating to addition and subtraction.

Next, the ENTER & ADD key is depressed, transmitting a narrow pulse to the master control logic network 110 in response to which the logic network generates an add sequence of control pulses. Referring to the timing diagram of FIG. 4, the enter and add pulse is shown in Graph A and occurs at time $t_1$. During this add sequence, the first number entered which is stored as a binary-coded decimal in network 120 is added to the binary-coded decimal number stored in the accumulator network 111. The number in network 111 is transferred into the storage network 128 at the beginning of the add sequence, the new sum being stored in the accumulator network. Since for the first add sequence, the first entered number is added to zero, which is the number stored in the accumulator register, this sequence of the operation effectively transfers the augend from the storage network 120 to the accumulator network 111.

The addend is then entered by appropriately depressing the keyboard 102 which places the addend into the storage registers 210 through 213, as previously described. The ENTER & ADD key is again depressed which commences the add sequence for adding the addend to the augend. In response to the enter and add pulse, the logic network 110 first generates add and subtract control pulses shown in GRaphs B and C, respectively. The add and subtract control pulses are applied to each of the pregate components 218 through 221 and to error sensor network 126. These pulses commence at time $t_2$ and extend over a complete add sequence to time T. At time $t_2$ inhibit control pulses shown in Graph D are also applied to the inhibit gate network 134 for transferring the data stored in the accumulator registers 265, 266, 267 and 268 into the storage registers 244, 245, 246 and 247, respectively. Control pulses commencing at time $t_3$ and extending to $t_5$, shown in Graphs E and F, are then applied simultaneously to control lines $G_1$ of rotary switch matrixes 214 through 217 and 248 through 251. These control pulses close the switches to which they are applied so as to empty the binary bits of the first digits from the first stages of storage registers 210 through 213 and 244 through 247. From $t_3$ to $t_5$ constitutes a first-digit period in which the binary bits of the first digits are added to each other. The bits from registers 210 through 213 are each transformed into a true and complementary signal and applied to respective pregate components 218 through 221. The pregate components process the applied data to accommodate either an add or subtract operation in the full adder-subtracter network 124. Accordingly, the data will appear at the appropriate output terminals of the pregate components pursuant to an add operation. (It is noted that for a subtract operation a one's complement is provided and the data appears at the output of the pregate components in an inverted condition.) The pregate data is coupled through DPDT switch components 230–233 to the X and $\overline{X}$ inputs of full adder-subtracter components 240 through 243. Correspondingly, the bits from registers 244 through 247 are transformed into true and complementary signals and applied through DPDT switch components 234 through 237 and applied to the Y and $\overline{Y}$ inputs of full adder-subtracter components 241–243. There are also carry signals supplied to components 241 through 243 from next lower order components. The buffer register 264 receives the carry output from component 243 to be applied to the component 240 during the succeeding digit sequence.

Addition is performed in each of the full adder-subtractor components in two phases extending over the period $t_3$ to $t_4$. During the first phase, uncorrected sums may appear at the outputs of full adder-subtracter components 240 and 243. The uncorrected outputs applied to error sensor network 126 cause a control signal to be generated by network 126 which actuates in parallel switches 230 through 237. Switches 230 through 233 apply the true and complementary uncorrected outputs of the full adder-subtracter components back to the X and $\overline{X}$ input terminals thereof. Switches 234 through 237 apply true and complementary signals of the binary-coded decimal number six to the Y and $\overline{Y}$ terminals of the full adder-subtracter components. During the second phase the new inputs are added together for providing at the output terminals of adder-subtracter components 240–243 corrected output sums. The control signal from network 126 is held for the remainder of the digit period until time $t_5$.

Immediately prior to $t_5$, at time $t_4$, control pulses, shown in Graph G are applied simultaneously to control lines $G_1$ of rotary switch matrixes 260 through 263 for closing the associated switches and entering the corrected sums of the first digits from adder-subtracter components 240 through 243 into the first stages of the corresponding accumulator registers 265 through 268. If a correct sum appears at the output of the adder-subtracter components during the first phase, a control signal is not generated by the error sensor network 126 and this sum is switched at $t_4$ to the accumulator registers.

In the next digit period of the operation, there is performed addition of the binary bits of the second digits of the stored binary-coded decimal numbers together with a carry that may have been generated in the first digit addition. Accordingly, between times $t_6$ and $t_8$ control pulses, shown in Graphs E and F, are applied simultaneously to control lines $G_2$ of the rotary switches 214 through 217 and 248 through 251. Actuation of the associated switches empty the binary bits of the second digits from the second stages of storage registers 210 through 213 and 244 through 247. Once again true and complementary signals are obtained from the output of pregate components 214 through 217 and applied to the X and $\overline{X}$ inputs of adder-subtracter components 240 through 243, and true and complementary outputs from rotary switches 248 through 251 are applied to the Y and $\overline{Y}$ inputs of said adder-subtracter components. Uncorrected sum outputs are given correction as previously described. At time $t_7$ control pulses are applied to control lines $G_2$ of rotary switch matrixes 260 through 263 for entering the corrected sums to the second stages of the accumulator register 265 through 268. The addition operation continues in a digit-by-digit sequence in the manner above described until each of the stages of the storage registers have been emptied and the corrected sums are entered in the accumulator registers. A single addition or subtraction operation for a maximum of two seven-digit numbers may be performed within several milliseconds.

Further addition operations for adding to the previously obtained sums may be readily performed as above described by sequentially entering the numbers to be further added and depressing the ENTER & ADD key for each addition operation.

A subtraction operation is performed in identical fashion to the addition operation and will be only briefly discussed. As with respect to an addition operation, the first number, the minuend, is entered and stored in the storage network 120 by depressing the appropriate keys of the keyboard 102. The ENTER & ADD key is then depressed which transfers the minuend from the storage network 120 into the storage network 128. The subtrahend is then entered by depressing the keyboard. Following this a SUBTRACT key of the function selector 103 is depressed which applies a subtract signal to master control logic network 110 for generating a subtract sequence. The subtract sequence is identical to the add sequence except that the add and subtract control pulses of Graphs B and C of FIG. 4 to pregate network 122 and error sensor 126 are now inverted. The interconnections between the pregate network 122 and the full adder-subtracter network 124 and the connections from network 124 to error sensor network 126 automatically provide in response to the subtract control signal, a subtract operation performed exactly as with respect to the addition operation. With regard to a subtract operation it may be appreciated that the carry signal of the addition operation becomes a borrow signal for subtraction.

Figure 5:
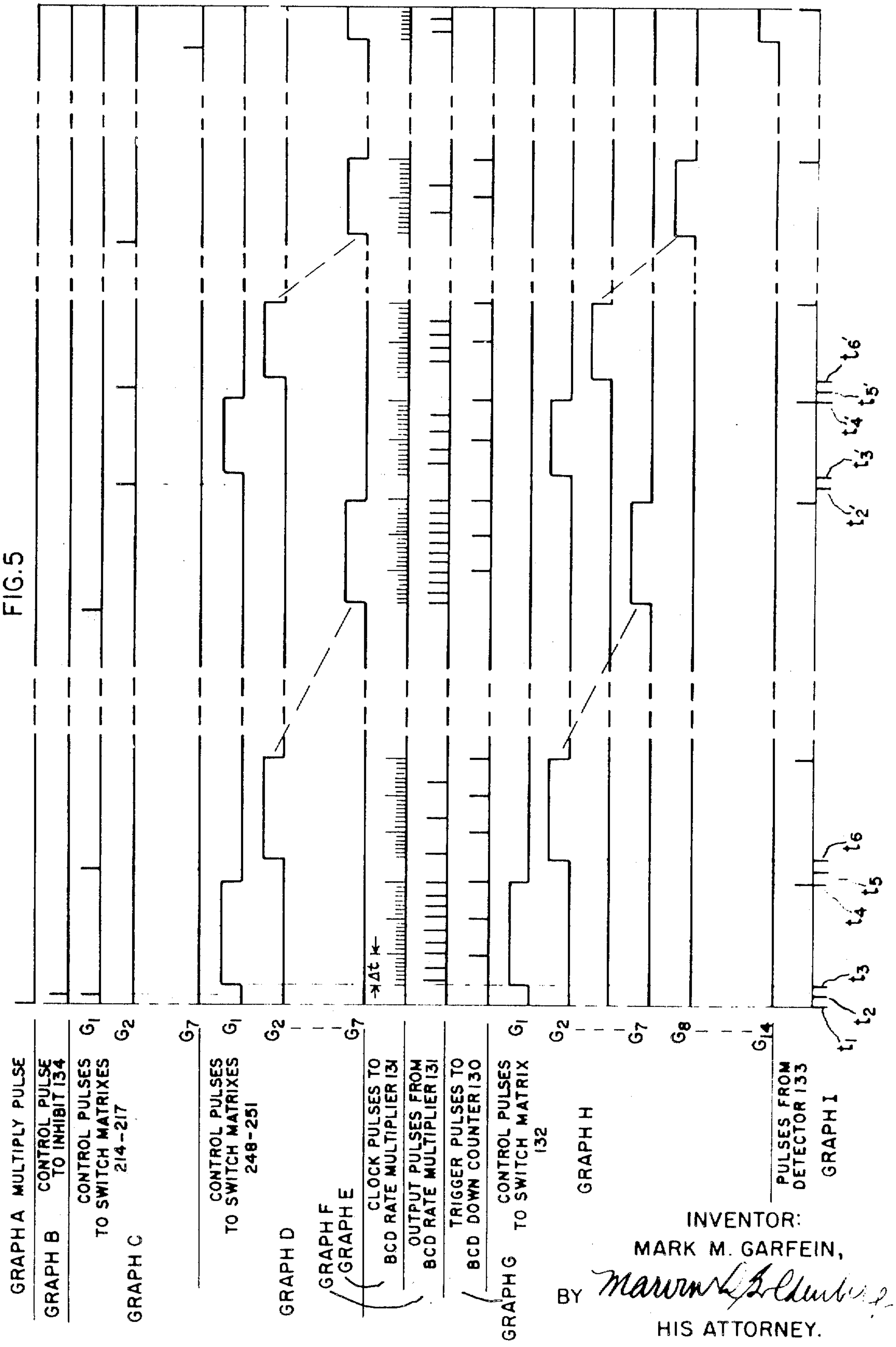
FIG. 5 presents a series of graphs employed in a description of the invention relating to multiplication.

For a multiplication operation of two multidigit numbers, the multiplicand is entered into the keyboard 102 and becomes stored in the registers 210 through 213 in the manner previously described. The ENTER & ADD key is then depressed which transfers the multiplicand from storage network 120 into the accumulator network 111. The multiplier is then entered into the keyboard 102 which stores the multiplier in storage network 120. Next, the MULTIPLY key is depressed which generates a multiply signal that is applied to the master control logic network 110 for commencing the multiply sequence. Referring to Graph A of FIG. 5 a narrow multiply pulse is seen to occur at time $t_1$. In response to the multiply pulse, the logic network 110 generates a narrow control pulse at time $t_2$ that is applied to inhibit gate network 134 for transferring the multiplicand from the accumulator network 111 into the storage network 128. This pulse is shown in Graph B. Also at time $t_2$ a narrow control pulse is simultaneously applied to control lines $G_1$ of rotary switches 214 through 217, shown in Graph C. The switches to which the control pulses are applied close and transfer the binary bits of the first digit from the first stages of storage registers 210 through 213 into the binary-coded decimal down counter 130. Commencing at time $t_3$ control pulses are applied to control lines $G_1$ of rotary switches 248 through 251, as shown in Graph D, for applying the binary bits of the first digit from the first stages of storage registers 244 through 247 to the BCD rate multiplier 131. Also commencing at time $t_3$ clock pulses at a given frequency $f_c$ are applied to the BCD rate multiplier 131 from the logic network 110, shown in Graph E.

The BCD rate multiplier comprises a binary counter which for one counting period $\Delta t=N/f_c$ provides a count of $N$. During $\Delta t$ the BCD rate multiplier gates out a discrete number of unary pulses, shown in Graph F the number being a function of the digit quantity applied form storage registers 244 through 247. Commencing at time $t_3$ there is a further control pulse applied from the logic network 110 to the control line $G_1$ of the rotary switch matrix 132, shown in Graph H, for entering the generated unary pulses into the first stage of the accumulator register 265. In addition to providing a storage function, storage registers 265, 266, 267 and 268 are connected to function as a decade counter. At the end of each period $\Delta t$, a pulse, shown in Graph G, is applied from the BCD rate multiplier 131 to the BCD down counter 130 for counting down by one unit. Upon the counter 130 being counted down to zero, its state is detected by the zero detector network 133 and a pulse is generated at time $t_4$, shown in Graph I. In response to the pulse from zero detector network 133, logic network 110 terminates the control pulses to control lines $G_1$ of switches 248 through 251 and to the control line $G_1$ of switch 132, and also gates off the clock pulse to the BCD rate multiplier.

At time $t_5$ control pulses are again applied to the control lines $G_1$ of switches 214 through 217, shown in Graph C, for reentering the first digit bits into BCD down counter 130. Commencing at time $t_6$ control pulses are applied to the control lines $G_2$ of rotary switches 248 through 251, shown in Graph D, for applying the binary bits of the second digit of storage registers 244 through 247 to the BCD rate multiplier. Commencing at time $t_6$ there are also applied control pulses to control line $G_2$ of the rotary switch 132, shown in Graph H, and clock pulses to the multiplier 131, shown in Graph E. The rotary switch 132 now connects the unary pulses generated by the BCD rate multiplier to the second stage of register 265. It is noted there are illustrated fewer output pulses from multiplier 131 during this digit sequence than the first, indicating the digit stored in the second stages of registers 244 through 247 to be of lower value than the digit stored in the first stages. Upon the down counter 130 again reaching a zero count, the zero detection network 133 applies a control pulse to the logic network 110 and the process is repeated. This process continues until all seven stages of the storage registers 244 through 247 are sequentially applied to the BCD rate multiplier 131.

In the next sequence of operation, at time $t_2'$ control pulses are simultaneously applied to control lines $G_2$ of rotary switches 214 through 217, shown in Graph C, for entering the binary bits of the second digit stored in registers 210 through 213 into the BCD down counter 130. Commencing at time $t_3'$ control pulses are simultaneously applied to the control lines $G_1$ of switches 248 through 251 for applying the binary bits of the first digit stored in registers 244 through 247 to the BCD rate multiplier, shown in Graph D. Commencing at this time $t_3'$ there are also clock pulses applied to the BCD rate multiplier, Graph E, and control pulses applied to control line $G_2$ of the rotary switch 132, shown in Graph H. Thus, the unary pulses generated by the BCD rate multiplier 131, Graph F, are applied to the second stage of the register 265. At time $t_4'$ a zero detection pulse is generated for terminating the control pulses and initiating the next digit sequence wherein the second digit binary bits from storage registers 210 through 213 are reapplied to the BCD down counter 130, and the second digit bits from storage registers 248 through 251 are applied to the BCD rate multiplier.

It is noted that the digit quantity applied to the BCD down counter 130 determines the pulse width of the pulses of Graphs D and H and, therefore, the length of each digit sequence. Further, the pulses generated by the BCD rate multiplier for each time period $\Delta t$ is proportional to the digit quantity applied to the rate multiplier. As a result, the pulses generated by the BCD rate multiplier 131 for each digit sequence is proportional to the product of the two applied digits.

The above described process repeats itself until seven stages of the registers 210 through 213 have been applied to the BCD down counter 130. It is noted that after each stage of the registers 210 through 213 is applied, the rotary switch matrix 132 shifts by one. This permits the accumulator registers 265 through 268 to correctly tabulate the product by means of the applied unary pulses. It may be seen that for a complete multiplication process seven stages of the storage network 128 are run through for each of the seven stages of storage network 120. This complete sequence of events occurs even though less than seven digit numbers are being multiplied. However, the time taken for processing those stages having "0's" stored in them is essentially instantaneous.

Figure 6:
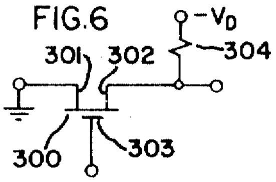
FIG. 6 is a schematic circuit diagram of a simple MOSFET single-pole, single-throw switch used prominently in the present circuit.

Consideration will now be given to schematic circuit diagrams of several of the system components of FIGS. 2 and 3. Referring to FIG. 6, there is illustrated a schematic circuit diagram of a simple MOSFET single-pole, single-throw switch 300, the single MOSFET switch being a basic device from which numerous MOSFET logic components of varying complexity can be fabricated. As shown, the device 300 includes a source electrode 301, a drain electrode 302 corresponding to the output, and a gate electrode 303 corresponding to the input. The source is connected to ground. For a P-channel MOSFET the drain electrode 302 is connected to a negative potential $-V_D$ through a load resistor 304. In response to a negative control signal applied to the gate electrode 303 of sufficient magnitude above its threshold voltage to cause saturation, the device becomes highly conductive in accordance with a closed-switch condition. In the presence of a control signal applied to the gate electrode less than threshold, e.g., at ground, the device is essentially nonconductive in accordance with an open switch position. It is seen that for an open-switch condition with a ground control signal applied, the output is negative. For a negative control signal to close the switch, the output increases positively. Thus, an inversion is provided between input and output.

In FIG. 7 there is illustrated a seven-input rotary switch matrix such as may be included in the described rotary switch networks. The rotary switch matrix comprises seven MOSFET switching devices 310. Input terminals 311 are connected to the respective drain electrodes of switches 310. Control terminals 312 are connected by control lines $G_1$ through $G_7$ to the gate electrodes of switches 310. The source electrodes of switching devices 310 are connected jointly to an output terminal 313. In the operation binary bits of logic "1's" and "0's" applied to input terminals 311 are selectively switched to output terminal 313 by a sequential application of control signals to the control lines $G_1$ through $G_7$. For use in the networks 121, 125 and 129, the input terminals 311 are supplied with inputs representing single bits of successively higher order digits. For use in the matrix 132 the input terminals 311 and the output terminal 313 become interchanged, there being supplied to terminals 311 unary pulses of successively higher order digits in the product.

Figure 8:
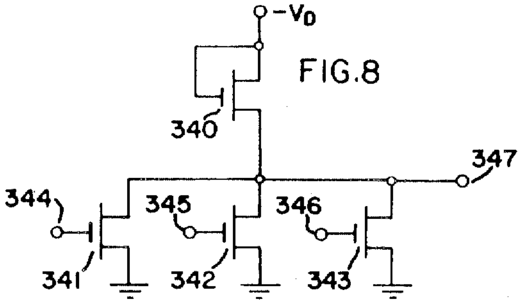
FIG. 8 is a schematic circuit diagram of a single-MOSFET NAND gate used prominently in the present circuit.

FIG. 8 is a schematic circuit diagram of a three-input NAND gate comprising a first MOSFET device 340, acting as a load, serially connected to three MOSFET switching devices 341, 342 and 343 which are in parallel. A negative voltage $-V_D$ is connected jointly to the drain and gate electrodes of the load device 340, the source electrode of which is connected to the junction of the drain electrodes of devices 341, 342 and 343. The source electrodes of devices 341, 342 and 343 are each connected to ground. Input terminals 344, 345 and 346 are connected at the gate electrodes of each of said switching devices, an output terminal 347 being at the junction of the drain electrodes.

In a typical operation, a logic "0" input, corresponding to a −V volts, is applied to at least one of the input terminals 344, 345 and 346 for turning ON the associated MOSFET device, and will generate a "1" at the output terminal 347, corresponding to zero volts. Conversely, a logic "1" is applied to all of the input terminals so as to turn OFF all of said devices, and will generate a logic "0" at said output terminal.

It may be appreciated that a wide range of multi-input NAND gates may be readily constructed by supplying the appropriate number of parallel connected MOSFET switching devices. It may also be noted that by adding an inverter function to the output of a NAND gate, there is provided an AND gate operation. The inverter function is readily supplied by a single MOSFET switching device.

FIG. 9 provides a schematic circuit diagram of a single pregate component of pregate network 122. Comprised are three two-input NAND-gates 350, 351 and 352. There are four input terminals 353, 354, 356 and 357 and two output terminals 358 and 359. Input terminals 353 and 354 are coupled to NAND-gate 350 and have respectively applied thereto an add control signal and a single true binary bit, shown as $X_i$. Input terminals 356 and 357 are coupled to NAND-gate 351 and have respectively applied thereto the complement of the binary bit applied to terminal 354, viz, $\overline{X}_i$, and a subtract control signal. The outputs of gates 350 and 351 are applied as inputs to NAND-gate 352. A first direct output from NAND-gate 352 is taken at output 358 and a second inverted output is taken at terminal 359. The output terminals 358 and 359 are applied to a full adder-subtracter component of the network 240 as described with respect to FIG. 10.

For an add operation, a logic "1" is applied to the add terminal 354 and a logic "0" to the subtract terminal 356. The inverse is true for subtraction. Considering an exemplary add operation where the true input signal is a logic "1," terminals 353 and 354 both have logic "1's" applied and generate a logic "0" at the output of NAND-gate 350. Terminals 356 and 357 both have logic "0's" applied, generating a logic "1" at the output of NAND-gate 351. A logic "1" will appear at terminal 358 and a logic "0" at terminal 359. For a subtract operation of a logic "1," the outputs will be inverted.

Figure 10:
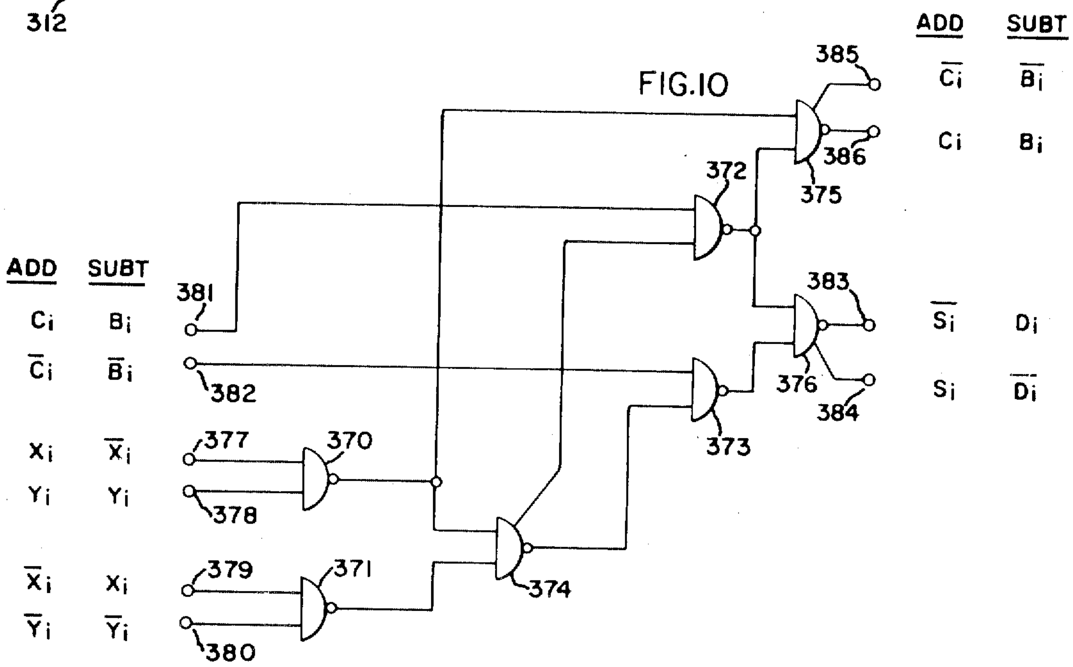
FIG. 10 is a schematic circuit diagram of a full adder-subtracter component of FIG. 3.

With reference to FIG. 10, there is illustrated a schematic circuit diagram of a full adder-subtracter component such as included in network 124. This component performs addition and subtraction on a given pair of bits of corresponding digits of two binary-coded decimal numbers, the component operating in digit sequence. Included are two input NAND-gates 370, 371, 372 and 373 for generating a single true output and two-input NAND-gates 374, 375 and 376 for generating outputs of both their true and complementary value. There are four input terminals 377, 378, 379 and 380 having applied thereto true and complementary input signals, and two input terminals 381 and 382 having applied true and complementary carry and borrow signals. A pair of output terminals 383 and 384 provide true and complementary sum and difference outputs, and a further pair of output terminals 385 and 386 provide true and complementary carry and borrow signals. Input terminals 377 and 378 are coupled to NAND-gate 370, and terminals 379 and 380 are coupled to NAND-gate 371. The outputs of NAND-gates 370 and 371 are coupled to NAND-gate 374, and an output of gate 370 is also coupled to NAND-gate 375. True and complementary outputs of NAND-gates 374 are coupled to NAND-gates 373 and 372, respectively. Input terminals 381 and 382 complete the input connection to NAND-gates 372 and 373, respectively. The output of NAND-gate 372 is connected to NAND-gates 375 and 376. The true and complementary outputs of gate 375 are connected to terminals 386 and 385, respectively, and true and complementary outputs of gate 376 are connected to terminals 383 and 384, respectively.

For an add operation, true values $X_i$ and $Y_i$ are connected to terminals 377 and 378, respectively, and their complements $\overline{X}_i$ and $\overline{Y}_i$ are connected to input terminals 379 and 380, respectively. True and complementary values of a carry signal are connected to input terminals 381 and 382, respectively. The true sum $S_i$ is obtained at output terminal 384 and its complement $\overline{S}_i$ is obtained at terminal 383. A true carry $C_i$ appears at terminal 386 and its complement $\overline{C}_i$ at 385. For a subtract operation, true values $X_i$ and $Y_i$ are connected to input terminals 379 and 378, respectively, and their complements $\overline{X}_i$ and $\overline{Y}_i$ are connected to terminals 377 and 380, respectively. True and complementary borrow signals $B_i$ and $\overline{B}_i$ are connected to terminals 381 and 382, respectively. The true difference signal $D_i$ appears at output terminal 383 and the complement of this value $\overline{D}_i$ is obtained at terminal 384. A true borrow $B_i$ appears at terminal 386 and its complement $\overline{B}_i$ at terminal 385.

To briefly illustrate one exemplary operation of the component of FIG. 10, an addition of two binary bits each having a logic value "1" with an applied carry of "1" will be considered. Accordingly, $X_i$ and $Y_i$ are each "1," $\overline{X}_i$ and $\overline{Y}_i$ are each "o"; and $C_i$ and $\overline{C}_i$ are "1" and "0," respectively. NAND-gate 370 will generate a logic "0" and NAND-gate 371 a logic "1." The true output at NAND-gate 374 will be a "1" and its complementary output a "0." NAND-gates 372 and 373 will in turn each generate a logic "1." With a logic "1" applied to each input of NAND-gate 376, output terminal 384 will generate a "0." With a logic "1" and "0" applied to NAND-gate 375, output terminal 386 will generate a "1."

A schematic circuit diagram of an error-sensor network 126 of FIGS. 2 and 3 is shown in FIG. 11. Component 126 includes two input NAND-gates 390, 391, 392, 393 and 394 and three input NAND-gate 395. Also provided are input terminals 396, 397, 398, 399 400, 401 and 402 and a single-output terminal 403. Input terminals 396 and 397 are connected to a NAND-gate 390, and terminals 397 and 398 are connected to gate 391. The outputs of gates 390 and 391 and input terminal 399 are connected to gate 395. The output of gate 395 and input terminal 400 are connected to gate 392. Input terminals 401 and 402 are connected to gate 393. The outputs of gates 392 and 393 are connected to gate 394 from which output terminal 403 is fed. This component has the true sum outputs $S_2$, $S_8$ and $S_4$ from full adder-subtracter components 243 and 242, respectively, of FIG. 3 as well as the complementary carry output $\overline{C}_8$ from component 243 coupled to input terminals 396, 397, 398 and 399, respectively. Add and subtract control signals and the true borrow signal $B_8$ from component 243 are connected to input terminals 400, 401 and 402, respectively. For a condition in which an uncorrected sum or difference is generated by full adder-subtracter network 124 of FIGS. 2 and 3 a signal is generated at output terminal 403 which is employed to activate the MPDT switch 123 of FIGS. 2 and 3. For example, with a logic "1" at input terminals 399 and 400, indicative of carry for an add operation; or with a logic "1" at terminals 401 and 402, indicative of borrow for a subtract operation, or with a logic "1" at terminal 397 and at either of terminals 396 and 398 for either an add or subtract operation, there will be generated a "1" at output terminal 403.

In FIG. 12 is a schematic circuit diagram of the binary-coded decimal rate multiplier 131 of FIGS. 2 and 3. The multiplier comprises a four-stage binary counter including conventional JK flip-flop stages 410, 411, 412 and 413. Each flip-flop stage has a J, K and CP input and a Q and $\bar{Q}$ output. Also included are four two-input NAND-gates 414, 415, 416 and 417 and a four-input NAND-gate 418. One input terminal 420 has a clock signal applied which is connected to the CP inputs of each counter stage. Further input terminals 421, 422, 423 and 24 are connected, respectively, as inputs to NAND-gates 417, 416, 415 and 414. Second inputs are applied to NAND-gates 414 through 417 from the $\bar{Q}$ outputs of stages 410 through 413, respectively. As the multiplier is connected in FIG. 3, binary bits $\alpha 1$, $\alpha 2$, $\alpha 4$ and $\alpha 8$ of a given digit are applied from successive stages of storage registers 244 through 247, respectively, to input terminals 421, 422, 43 and 424. An output terminal 425 is taken from NAND-gate 418, providing a unary pulse code which corresponds to the binary-coded decimal digit applied to input terminals 421 through 24. A logic "1," ground, is applied to inputs J and K of stage 410. The Q output of stage 410 is connected to J and K inputs of stage 411 and is further connected to AND-gate 426. The Q output of stage 411 is also connected to AND-gate 426. The output of gate 426 is connected to inputs J and K of stage 412 and to an input of AND-gate 427, and provides an output connected to inputs J and K of stage 413. RC differentiating pairs 428 connects the $\bar{Q}$ outputs of each of the flip-flop stages to their respective NAND gates for distinguishing in time the pulses applied to said NAND gates. The outputs of NAND-gates 414 through 417 are connected as inputs to NAND-gate 418. The output of gate 417 is also connected to an output terminal 429 for supplying trigger pulses to the down counter 130.

Considering the operation of the binary-coded rate decimal multiplier 131 of FIG. 12, there are 16 clock pulses applied each counting period $\Delta t$. In response to a clock input signal frequency $f_c$, signals are provided from the $\bar{Q}$ terminal outputs of stages 410, 411, 412 and 413 at diminishing frequencies of $f_c/2$, $f_c/8$ and $f_c/16$, respectively. As a function of the binary bit signals applied to input terminals 421 through 424, one or more of the NAND-gates 414 through 417 will generate a "0" which in turn causes a "1" to be generated at the output terminal 425 for each time one of the previous NAND gates generates a "0." This "1" is no longer a binary pulse but is now in the form of a unary pulse. For example, consider the decimal digit six to be applied to the rate multiplier which in binary-coded decimal form provides a "1" energization at input terminals 422 and 423, NAND-gate 415 will generate a "0" at a frequency of $f_c/4$, which will amount to four pulses for every 16 clock pulses, and NAND-gate 416 will generate a "0" frequency $f_c/8$, amounting to two pulses for every 16 clock pulses. Thus, six pulses appear at the output terminal 425 per $\Delta t$. Correspondingly, an applied digit three will generate three pulses per $\Delta t$ at terminal 425, etc.

Figure 13:
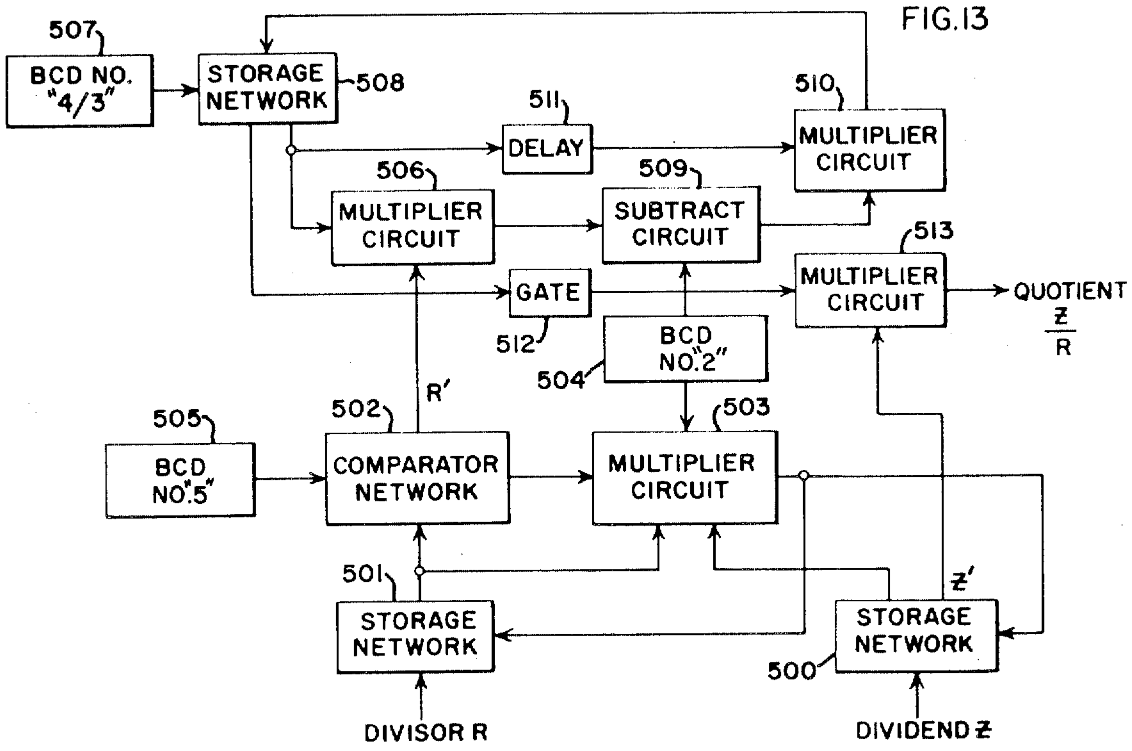
FIG. 13 is a functional block diagram illustrating a division operation employing multiplication and addition-subtraction circuitry shown in FIGS. 2 and 3.

In FIG. 13 there is illustrated a functional block diagram for performing a division operation, employing the multiplication and addition-subtraction circuitry with respect to FIG. 3. For an operation of $Q=Z/R$, the reciprocal $T$ of the divisor $R$ is obtained through an iterative process and then multiplied by the dividend so that $Q=ZT$. An iterative formula for computing the reciprocal of the quantity $T=1/R$ is:

$$T_{j+1}=T_j(2-RT_j)(j=0, 1, 2 \ldots) \qquad (1)$$

$$\lim_{j\to\infty} T_j=1/R \qquad (2)$$

It may be determined that for a most significant digit of $R$ of 5 or greater, selecting the initial value of $T_j$ equal to 4/3, obtains a sufficiently close approximation of $T$ to $1/R$ after four alterations.

Considering FIG. 13, there is illustrated a first storage network 500 into which the dividend $Z$ is entered and a second storage network 501 into which the divisor $R$ is entered. The storage networks 500 and 501 may be similar to networks 120 and 128 of FIG. 2. The output of storage network 501 is coupled to a comparator network 502 and also to a multiplier circuit 503. The output of storage 500 is also coupled to circuit 503 as is a source 504 for storing the BCD number two. The multiplier circuit 503 includes components illustrated in FIG. 3 for providing a multiplication of each of the applied inputs by the number two. A source 505 for storing the BCD number five is coupled as the second input to comparator network 502 for making a comparison with the most significant digit of the divisor $R$. For most significant digits less than five a signal is applied to the multiplier circuit 503 for causing it to multiply both the divisor $R$ and the dividend $Z$ by two, which products are fed back to the storage networks 500 and 501. A second comparison is then made in the comparator network 502 and if the most significant digit is still less than five the multiplication process is repeated. When the most significant digit exceeds 5 the modified divisor $R'$ is coupled as a first input to a multiplier circuit 506.

A source 507 for storing a decimal constant of 4/3, the initial value of $T_j$, is coupled to storage network 508 and the output applied as a second input to the multiplier circuit 506. The multiplier circuit 506 multiplies this constant by $R'$, the resulting product being coupled to a subtract circuit 509 as the subtrahend. Also coupled to the subtract circuit 509 as the minuend is the constant from source 504. The difference at the output of circuit 509 is $(2-R'T_j)$. This quantity is applied to a further multiplier circuit 510. Also connected to multiplier circuit 510 through a delay circuit 511 is the quantity from network 508. The product output of multiplier circuit 510, the quantity $T_j(2=R'T_j)$, is connected to the storage network 508 and becomes the new value $T_j+1$ which is now coupled to multiplier circuit 506 and, with delay, to multiplier circuit 510. The process is repeated for three traversals of the closed loop at the end of which time the output from storage network 508 is coupled through gate 512 and is applied to a final multiplier circuit 513 to which is also applied modified dividend $Z'$. The output quotient $Z/R$ appears at the output of multiplier circuit 513.

What I claim as new and desire to secure by Letters Patent of the United States is:

1. An electronic calculator for performing multiplication operations of two multidigit binary-coded decimal numbers, comprising:

a. a first storage network for storing one of said numbers, said first storage network including four multistage registers, one register for each binary bit order of the stored decimal digits, b. a second storage network for storing the other of said numbers, said second storage network including four multistage registers, one register for each binary bit order of of the stored decimal digits, c. A four-stage binary-coded decimal counter, d. a first switch network for applying in parallel the binary bits of each digit of said one number to the stages of said binary-coded decimal counter, e. a binary-coded decimal rate multiplier for generating during a given period unary pulses proportional in number to an applied input quantity, f. a second switch network for applying in parallel the binary bits of each digit of said other number to said rate multiplier for determining the number of unary pulses generated during each given period, g. an accumulator network comprising multiple binary-coded decimal counter stages, one for each bit order of the processed decimal digits, h. a third switch network for applying the generated unary pulses from said rate multiplier in an advancing succession to the counter stages of said accumulator network, i. means for applying a trigger signal to said binary-coded decimal counter once each given period for causing said binary-coded decimal counter to count one unit, and j. detection means responsive to the count in said decimal counter for terminating the generation of said unary pulses from said rate multiplier upon said count reaching a given reference value, whereby the generated unary pulses are a function of the product of digits applied to said decimal counter and to said rate multiplier.

2. An electronic calculator as in claim 1 wherein said first switch network is operated in a first digital sequence and said second switch network is operated in a second digital sequence having a multiple relationship with said first digital sequence so as to provide a cross products of the digits of said two binary-coded decimal numbers.

3. An electronic calculator as in claim 2 wherein said binary-coded decimal counter is operated in a countdown mode and said detection means comprises a zero detector responsive to a zero count of said decimal counter for terminating the generation of said unary pulses.

4. An electronic calculator as in claim 3 which employs integrated circuit MOSFET devices in its construction.

5. An electronic calculator for performing division operations of two decimal numbers, comprising:

first storage means for storing the dividend and divisor, b. comparator means for comparing the most significant digit of the divisor stored in said first storage means with a first constant and generating a first output when said constant is the larger value, a second output when said constant is the lesser value or an equal value, c. first multiplier means responsive to said first output of said comparator means for multiplying said dividend and divisor by a second constant to provide a modified dividend and divisor, d. means for coupling said modified dividend and divisor back to said first storage means, e. second storage means for storing a given value and having a third constant initially stored therein, f. second multiplier means responsive to said second comparator for multiplying said modified divisor by the value stored in said second storage means, g. subtracter means for subtracting the output of said second multiplying means from said second constant, h. third multiplier means for multiplying the output of said subtracter means by the value stored in said second storage means, the output of said third multiplier means being coupled to said second storage means for updating the stored value, after several updatings said stored value closely approximating the reciprocal quantity of the modified divisor, and i. fourth multiplier means for multiplying the updated value stored in said second storage means by said modified dividend for obtaining the quotient of said two decimal numbers.